United States Patent

[11] 3,554,465

[72] Inventor Yujiro Marukawa
Ichinoseki-shi, Japan

[21] Appl. No. 858,392
[22] Filed Sept. 16, 1969
[45] Patented Jan. 12, 1971

[73] Assignee General Denshi Kogyo Kabushiki Kaisha
Ichinoseki-shi, Japan
a limited liability company of Japan

[32] Priority Sept. 16, 1968
[33] Japan
[31] 43/80,682

[54] TAPE DRIVE UNIT FOR TAPE RECORDER

9 Claims, 6 Drawing Figs.

[52] U.S. Cl. ........ 242/201
[51] Int. Cl. ........ B11b 15/32; G03b 1/04
[50] Field of Search ........ 242/201, 210

[56] References Cited

UNITED STATES PATENTS

| | | | |
|---|---|---|---|
| 3,057,570 | 10/1962 | Smith | 242/203 |
| 3,286,943 | 11/1966 | Morimoto | 242/201 |
| 3,317,152 | 5/1967 | Fukatsu | 242/201 |
| 3,472,465 | 10/1969 | Idoine et al. | 242/201 |

*Primary Examiner*—Leonard D. Christian
*Attorney*—Jecies and Grenside

ABSTRACT: A tape drive unit for a tape recorder comprising a takeup reel shaft, a friction disc operatively connected with a drive source normally for driving the shaft, a transmission roller operable to operatively connect the shaft with the drive source, control means to disengage the friction disc from operative connection with the shaft and at the same time to engage the transmission roller with the shaft, and reset means for resetting the control means. The transmission roller is mounted on a rockable lever, of which movement is controlled by said control means and said resetting means.

*INVENTOR*
Yujiro Marukawa

*INVENTOR*
Yujiro Marukawa

INVENTOR
Yujiro Marukawa

INVENTOR
Yujiro Marukawa

INVENTOR

Yujiro Marukawa

TAPE DRIVE UNIT FOR TAPE RECORDER

The invention relates to a tape drive unit for a tape recorder, and more particularly to a tape drive unit which is provided with operating levers associated with recording/playback, rapid feed, rewind and stop modes of operation and which enables the switching between any combination of such modes of operation with a single operation of any one of the operating levers.

Tape recorders of cassette type, that is, incorporating a tape magazine having self-contained supply and takeup spools together with a fresh or recorded magnetic tape thereon and permitting automatic loading of the tape in the tape recorder when the magazine is placed in position thereon are already known. In this kind of tape recorders, a simple switching between different modes of operation is particularly desirable. While the simple operation of switching is also highly desirable in a number of other types of tape recorders, the achievement of a simple switching operation with mere manual depression of kinds has been the object of efforts particularly in the field of tape recorders of cassette type. In prior tape recorders of cassette type, several knobs are provided each associated with different modes of operation, but the stop knob, that is, knob to interrupt the drive had to be operated before any switching can take place.

Obviously, the simplicity of construction and low cost are the main objects of designs, so that it is preferable that a single motor can be used to provide necessary drive in various modes of operation. However, in the past, more than one motor had to be used for different modes of operation or the construction was complex enough to cause various difficulties such as the breaking of the tape, and no satisfactory control unit has been known.

Therefore, it is a general object of the invention to provide a tape drive unit which completely avoids above disadvantages.

It is a specific object of the invention to provide a tape drive unit for tape recorder which enables a single operation of any operating lever associated with each mode of operation to switch the tape recorder into the desired mode of operation in a smooth and simple manner.

It is another object of the invention to provide a tape drive unit for tape recorder that is simple in construction and inexpensively manufactured.

According to the invention, the tape drive unit comprises individual operating levers each associated with different modes of operation, and these operating levers are arranged such that operation of any one of them permits power from a single drive source to be transmitted to the desired reel so as to drive the latter at the given speed and in the desired direction or the power from the source to be interrupted.

The invention will be described in further detail with reference to one embodiment thereof shown in the drawings wherein.

Figure 1:
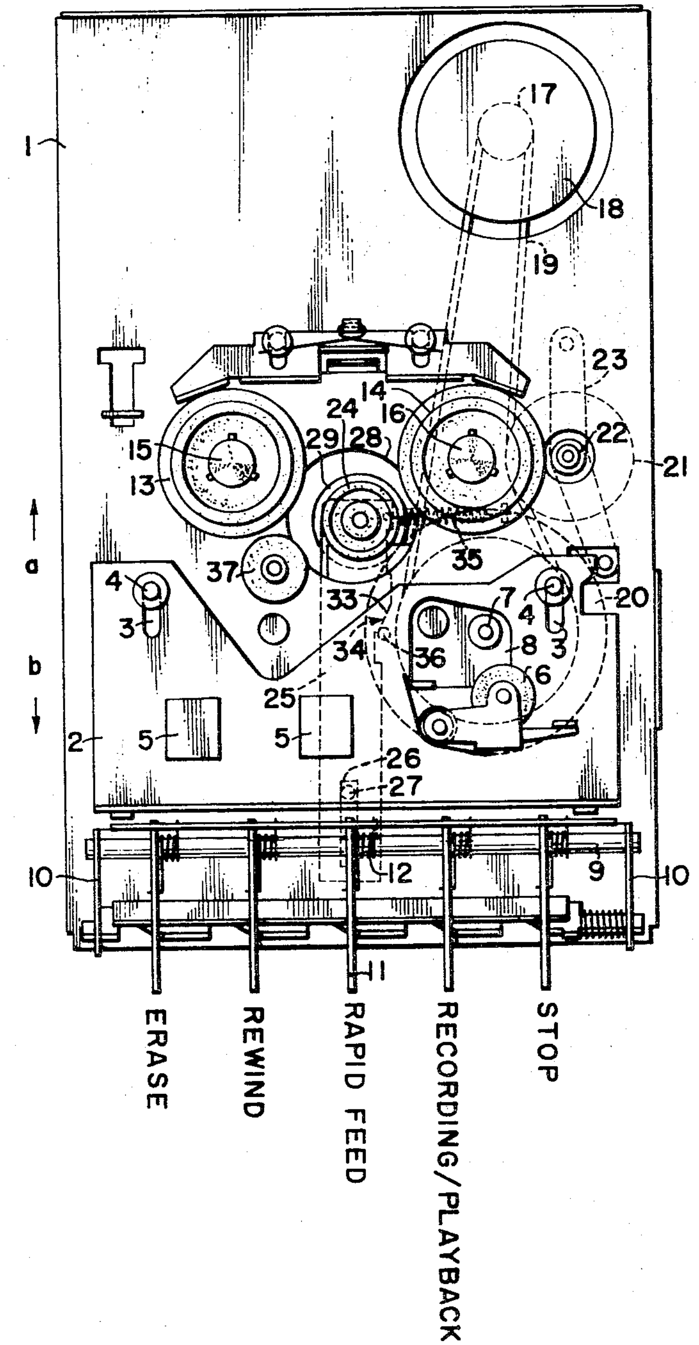
FIG. 1 is a plan view of the tape drive unit according to the invention, the unit being shown in its stop position.
Figure 2:
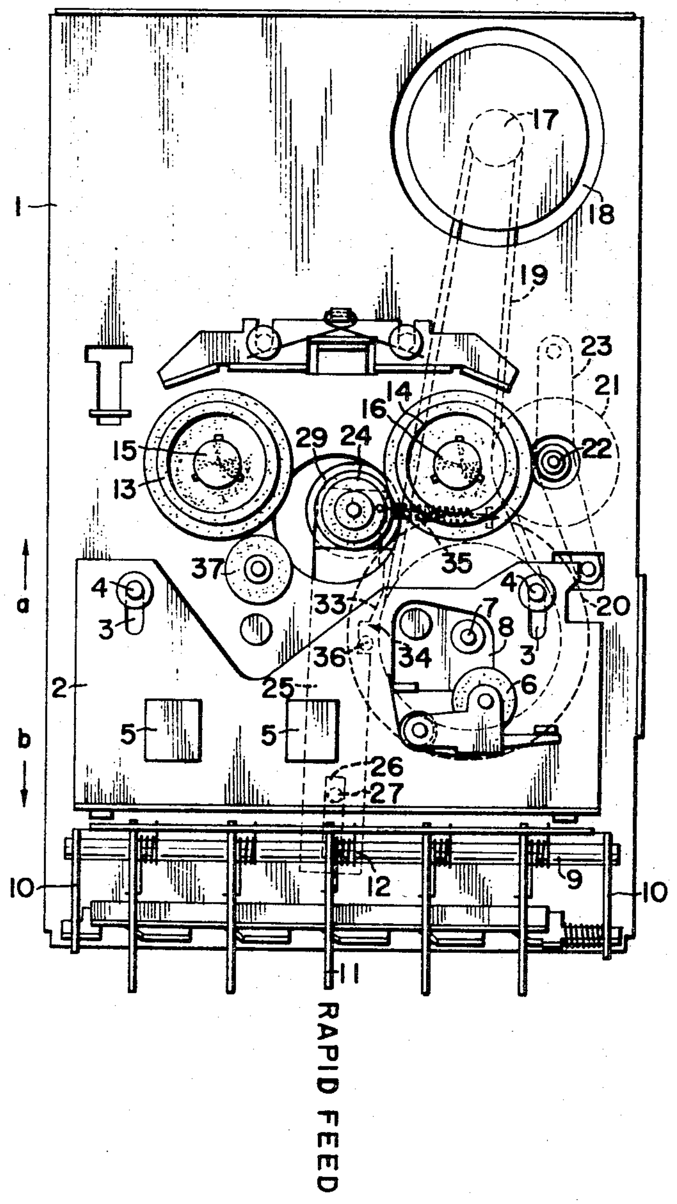
FIG. 2 is a plan view of the embodiment shown in FIG. 1 in the rapid feed mode of operation.
Figure 3:
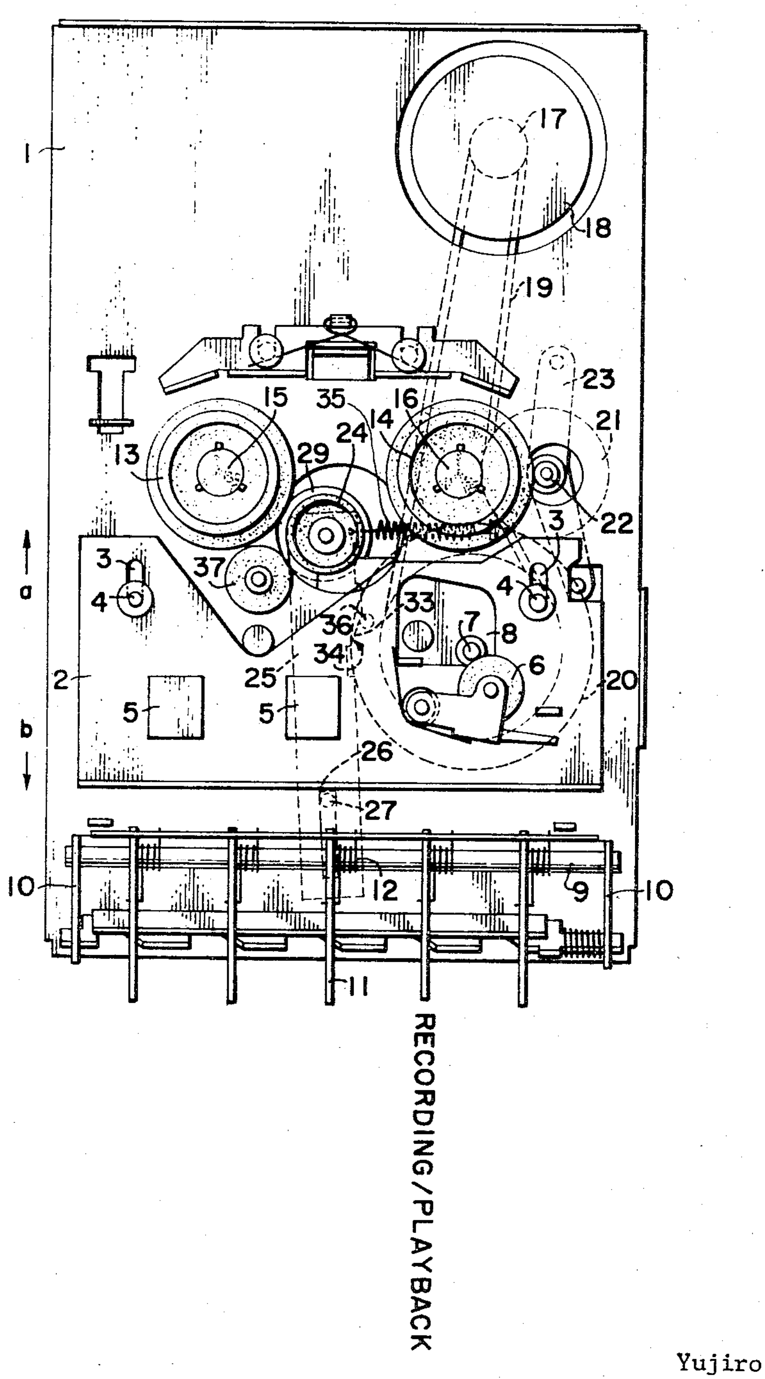
FIG. 3 is a plan view of the embodiment shown in FIG. 1 in the recording/playback mode of operation.

Referring to the drawings, and particularly to FIGS. 1 to 3, the tape drive units of a tape recorder is shown in three different modes of operation. On the top face of the chassis 1 of a tape recorder is mounted a base plate 2 so as to be slidable in the direction indicated by arrows *a* and *b*. The base plate 2 is formed with a pair of slots 3 on opposite side parts which are engaged by projections 4 extending from the chassis 1, the projections 4 serving as guides for the movement of the base plate. On the base plate 2 are securedly mounted a pair of spaced magnetic heads 5 and a pinch roller 6. The pinch roller 6 is arranged opposite to a capstan 7 which is mounted on the chassis 1 and extends therefrom through a notched opening 8 in the base plate 2. On the end, as viewed in the direction of arrow *b*, or the front end, of the chassis 1 is mounted a laterally extending shaft 9 which is supported at its both ends at 10. A plurality of operating levers 11 are pivoted on the shaft 9 and are urged by respective springs 12 to assume their raised or horizontal position normally. In the actual tape recorder, knobs will be attached to the ends of these operating levers 11, but are not shown in the drawings. However, it will be understood that in use, manual operation or depression of the knob results in an angular movement of its associated operating lever about the shaft 9.

In the central part of the chassis 1, there are positioned a pair of reel receptacles or bases 13 and 14 which are mounted on winding shafts 15 and 16 and connected thereto by a splined connection. Tape recorders of this kind are adapted to be used with a tape magazine, usually referred to as "Cassette", which houses a supply reel and a takeup reel together with a length of magnetic tape on either reel. As is well know, the cassette provides a convenient loading in that when the cassette is placed in proper position in the tape recorder, the reels therein are automatically connected with the winding shafts 15 and 16. In this respect, the tape recorder according to the invention is constructed in the same manner as in the prior art devices.

Figure 5:
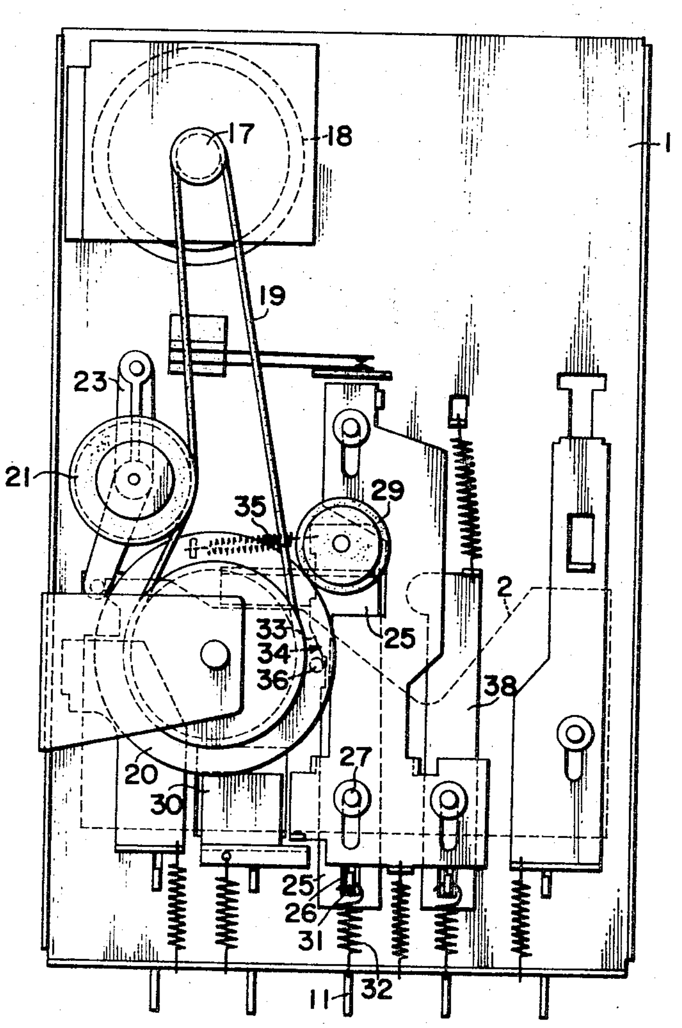
FIG. 5 is a bottom view of the embodiment of FIG. 1.

Beneath the chassis 1 is provided a drive motor 18 having a rotary shaft 17, as is clearly shown in FIG. 5. A drive belt 19 extends around the rotary shaft 17 and a flywheel 20 that is mounted on the same axle as the capstan, and hence the rotary shaft 17 directly drives the flywheel 20 in the recording/playback, rapid feed and rewind modes of operation. The capstan 7 cooperates with the pinch roller 6 to move the tape that is passed therebetween at predetermined speeds. The winding of tape in the recording/playback mode is accomplished by frictional drive imparted to the reel base 14 from a roller 22 that is mounted on the same axle as another roller 21 which is located in contact with and driven by the drive belt 19. In order to provide a smooth drive to the reel base 14, the axle on which both rollers 21 and 22 are mounted is mounted on the chassis 1 through a buffering support 23. The buffering support 23 has its shaft movably supported to allow a frictional coupling between the roller 22 and the reel base 14 only when the tape recorder is in the recording/playback mode.

The tape drive unit according to the invention comprises a control lever 25 which includes a transmission roller 24. The control lever 25 is arranged centrally on the underside of the chassis 1 to extend longitudinally thereof. The control lever 25 is formed with a guide slit 26 in its front-side end part, and a guide pin 27 extending from the chassis 1 engages the guide slit 26. As will be noted in the drawings, the slit 26 is elongate in the longitudinal direction of the control lever 25, and the arrangement is such that the control lever 25 is movable lengthwise or in the direction of arrows *a* and *b* and is also movable angularly. The transmission roller 24 is pivoted to the rear end of the control lever, and an opening 28 is cut in the chassis 1 intermediate the two reel bases 13 and 14 to allow the pivot of the roller 24 to extend therethrough so as to position the transmission roller 24 above the level of the chassis 1. On the same pivot is mounted beneath the chassis 1 another roller 29, and the transmission roller 24 and said another roller 29 can be brought into engagement with or disengagement from the reel base 14 and the flywheel 20, respectively, by the movement of the control lever 25. As mentioned above, the guide slit 26 in the control lever 25 has a substantial length and the pin 27 engages the slit 26 at its rearward part. As the control lever 25 moves in the direction of arrows *a* and *b*, this movement is guided by the engagement between the pin 27 and the slit 26, and at the same time the control lever 25 moves angularly.

Several operating levers 11 are designated "Stop", "Recording/playback", "Rapid Feed" "Rewind" and "Erase". Operation of any one of the operating levers 11 results in the intended operation. For example, when the second from right of the five operating levers, which is designated "Recording/Playback", is operated, an operating member 30 (FIG. 5) for the base plate is actuated to cause retraction of the base plate 2 in the direction of arrow *a*, thereby bringing the pinch roller 6 into contact with the capstan 7 with the tape interposed therebetween and moving the drive roller 22 into frictional engagement with the reel base 14.

Figure 4:
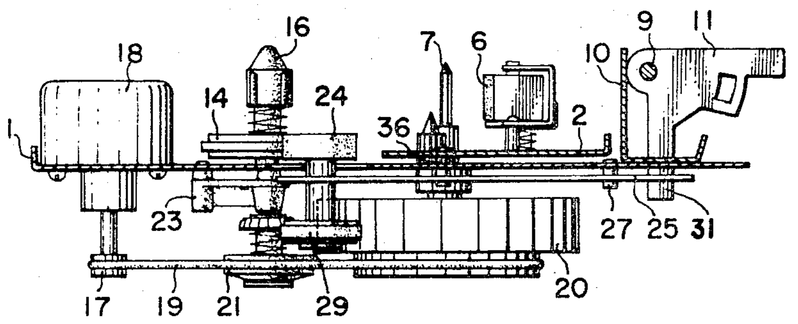
FIG. 4 is a side elevation of the embodiment of FIG. 1.

The center operating level, which is designated "Rapid Feed", is shown in detail in FIG. 4. As will be seen, this operating lever is L-shaped in side elevation and has a downwardly extending engaging piece 31, which extends through an opening (not shown) in the chassis 1 and engages the guide slit 26 in the control lever 25 in the forward part of the slit. A tension spring 32 extends between the engaging piece 31 and the front end of the chassis 1, and cooperates with the spring 12 to return the operating lever 11 to its neutral position (FIG. 4). As a result, unless the operating lever 11 is angularly moved or rotated clockwise, as viewed in FIG. 4, its engaging piece 31 remains engaged in the forward part of the guide slit 26 in the control lever 25. When the operating lever is rotated, the lever is held in its rotated position by self-holding mechanism which in itself is well known in the art and therefore not shown in the drawing. As the operating lever 11 is rotated, the engaging piece 31 also moves angularly, such movement causing the piece 31 to move in the elongate guide slit 26 from its forward part towards its rearward part.

Figure 6:
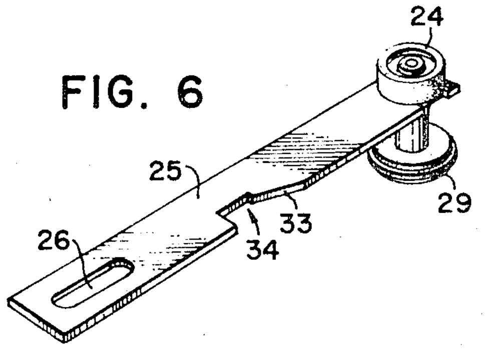
FIG. 6 is a perspective view of the control lever including the transmission roller shown in FIGS. 1 to 5.

As shown in FIG. 6, the control lever 25 is formed with a notch cam 34 in the central part thereof, the cam 34 including an inclined edge 33. In the assembled condition of the unit, the control lever 25 is urged by spring 35 towards the reel base 14. The spring 35 is provided between the control lever 25 and the chassis 1, and urges the control lever 25 so as to achieve frictional engagement of the transmission roller 24 and the roller 29 with the reel base 14 and the flywheel 20, respectively. The notch cam 34 is positioned on the side of the control lever towards which it is urged by the spring 35, and a control pin 36 is provided on the underside of the base plate 2 to extend through an elongate slit (not shown) in the chassis 1 so as to cooperate with the notch cam 34. Obviously, the control pin 36 is integrally movable with the base plate 2 and said elongate slit allows for such movement of the control pin.

As mentioned previously, the control lever 25 is normally urged by spring 35 to cause the simultaneous frictional engagement of the transmission roller 24 and the roller 29 with the reel base 14 and the flywheel 20, respectively. Consequently, if the control lever 25 is left free to move without restriction by any member, the tension exerted by the spring 35 will directly move the control lever to have the transmission roller 24 frictionally engaged with the reel base 14 and to have the roller 29 frictionally engaged with the flywheel 20, thereby causing rotation of the reel base 14 together with the flywheel 20. This represents the condition for "Rapid Feed". However, except for the "Rapid Feed" mode, the transmission roller 24 must not drive the reel base 14.

FIG. 1 shows the tape drive unit of the invention in the stop position of the tape recorder. In this condition, the pinch roller 6 must be kept away from the capstan 7, and so the base plate 2 which carries the pinch roller is moved forwardly, or in the direction of arrow *b*. It will be evident that at this time, the operating lever for "Stop" is operated and not other operating levers 11 are operated. Thus, the operating lever 11 for "Rapid Feed" is in its neutral position, and the engaging piece 31 of this operating lever 11 is positioned forwardly in the guide slit 26 of the control lever 25. As a result, the control lever 25 cannot move lengthwise and remains stationary, even though it is urged by the spring 35. The transmission roller 24 is hence kept away from the reel base 14. This is so maintained because the control pin 36 abuts against the inclined edge 33 of the notch cam 34, thereby preventing the Control lever 25 from yielding to the tension of the spring 35. It will be understood, however, that if the control lever 25 were not restricted by the engaging piece 31 and able to move in the direction of arrow *a*, then the control lever would move in such direction with the inclined edge 33 of the notch cam 34 being guided by the control pin 36 and at the same time, the control lever would rotate clockwise, with consequent frictional engagement between the transmission roller 24 and the reel base 14. Therefore, it will be appreciated that the engaging piece 31 as well as the control pin 36 serves to control the movement of the control lever 25. In the stop position, the roller 29 on the same pivot as the transmission roller 24 remains in frictional engagement with the flywheel 20.

With the tape recorder incorporating the present invention, it is a simple matter to change from the stop position to rewind condition. Thus, in the position of the transmission roller 24 shown in FIG. 1, energization of the motor 18 will result in the rotation of the transmission roller 24 by virtue of the frictional engagement between the roller 29 and the flywheel 20, and an arrangement is provided such that such rotation of the transmission roller 24 provides an indirect drive to the other reel base 13. Numeral 37 denotes a roller that is positioned above the level of the chassis 1 and that has its shaft extending through an opening (not shown) in the chassis and mounted on a support lever 38 (FIG. 5) located underneath the chassis. The support lever 38 is associated with one of the operating levers 11 that is designated "Rewind" and is movable, upon operation of this operating lever, so as to bring the rewind roller 37 into operational engagement with both of the transmission roller 24 and the reel base 13 simultaneously.

With the tape recorder above described, it is possible to change from the stop position, rewind condition or any other mode of operation to the rapid feed condition, and vice versa, it being understood that the term "Rapid Feed" is intended herein to mean the feed of the tape in its forward direction at a rate greater than that used in the recording/playback mode, and is distinguished from the rewind operation even though the rate of movement of the tape is the same in this condition as in the rapid feed mode.

FIG. 2 shows the tape drive unit in its rapid feed mode. One of the operating levers 11 designated "Rapid Feed" is operated, and it is held in the position which it assumes by clockwise rotation from the position shown in FIG. 4. As mentioned previously in connection with FIG. 1, as the operating lever for "Rapid Feed" rotates clockwise, the engaging piece 31 moves rearwardly in the guide slit 26 and frees the control lever 25 to move lengthwise, whereupon it turns clockwise, as viewed in FIG. 2, by the urging tension of the spring 35 while moving in the direction of arrow *a*, with consequence that the transmission roller 24 is frictionally coupled with the reel base 14. At this time, the roller 29 moves from its position shown in FIG. 1 to its position in FIG. 2 by rolling on the peripheral surface of the flywheel 20, thus maintaining its frictional engagement with the flywheel 20. During such movement, the notch cam 34 moves to receive the control pin 36 along its inclined edge 33, and the guide pin 27 in the guide slit 26 serves to guide the movement of the control lever 25. When switching from rewind to rapid feed mode, the rewind roller 37 returns to its retracted position by the operation of the operating lever for "Rapid Feed".

FIG. 3 illustrates the recording/playback mode. As briefly stated before, the operation of the operating lever for "Recording/Playback" causes the operating member 30 to move the base plate 2 in the direction of arrow *a*, with the result that the pinch roller 6 is moved towards the capstan 7 to press the tape against the latter and the drive roller 22 is frictionally coupled with the reel base 14. The drive roller 22 is of smaller diameter than that of the transmission roller 24 so that in this mode, the reel base 14 is driven at a lower rate than in the rapid feed mode. It should be understood that when the operating lever for "Recording/Playback" or any other operating lever is operated, other operating lever which has been operated previously is released. Since such release mechanism is well known in the art, it will not be described herein. Thus, because now the operating lever for "Recording/Playback" is operated, the operating lever for "Rapid Feed" is released and remains in its neutral position. However, as a distinction from the situation for the stop position shown in FIG. 1, the movement of the base plate 2 in the direction of arrow *a* causes the control pin 36 secured thereto to push the inclined edge 33 of the notch cam 34 upwardly, as viewed in FIG. 3, whereby the control lever 25 is turned counterclockwise as viewed in this FIG. against the tension of the spring 35. This turning motion moves the transmission roller 24 and the roller 29 out of engagement with the reel base 14 and the flywheel 20, respectively. This removes additional load from the flywheel 20 and assures a stable drive to be imparted to the capstan 7 from the latter, thereby allowing the capstan 7 to drive the tape at a predetermined speed adequate for good recording and playback.

When changing from the recording/playback mode to rapid feed mode, the operating lever for "Rapid Feed" is operated, whereupon the operating lever for "Recording/Playback" is released and the sequence of operation as mentioned above with reference to FIG. 2 will be initiated. Thus, it is evident that the direct switching to the rapid feed mode is possible from any other mode of operation.

While the invention has been described with reference to a particular embodiment, it should be obvious that various changes and modifications are readily possible by one skilled in the art within the scope of the invention. Thus, for example, the control lever 25 may be provided with the control pin 36 instead of the notch cam 34, which then can be transferred to the base plate 2. Therefore, the above description is only illustrative of the invention and should not be construed as limiting the invention.

I claim:

1. A tape drive unit for a tape recorder comprising a takeup reel shaft, a friction disc operatively connected with a drive source normally for driving the shaft, a transmission roller operable to operatively connect the shaft with the drive source, thereby causing the shaft to be driven at a different number of revolutions from that provided by said friction disc, control means to disengage the friction disc from operative connection with the shaft and at the same time to engage the transmission roller respectively with the shaft, and reset means for resetting said control means.

2. A tape drive unit according to claim 1, in which said transmission roller is carried on one end of a rockable lever movable from its inoperative position in which it is normally latched by latch means to its operative position upon actuation of said control means to release said latch means.

3. A tape drive unit according to claim 2, in which said rockable lever is resiliently urged in a direction to move past said one end and to bring the transmission roller into operative connection with the shaft; and said latch means comprises an elongate slot at the end of the rockable lever remote from said one end, said slot being engaged adjacent its one end nearer said one end of the lever by a fixed pin, a stop engaging said slot adjacent the end thereof remote from said one end of the rockable lever, a cam formed in the side of the rockable lever nearer said shaft, and a second pin engaging the cam.

4. A tape drive unit according to claim 3, in which said control means comprises means for moving said stop in said slot towards said one end thereof.

5. A tape drive unit according to claim 4, in which said reset means comprises means for moving said second pin to cause an angular motion of said rockable lever about said fixed pin against the action of the resiliently urging force.

6. A tape drive unit according to claim 5, further including a base plate on which are mounted at least one magnetic head, a pinch roller which is operable with the motion of said base plate, and a capstan driven by the drive source, said capstan being provided at a distance from the pinch roller and separately from said base plate and integrally movable therewith, as said reset means is operated, so as to move said second pin to cause said angular motion of the rockable lever and to bring said pinch roller into contact with said capstan with a tape interposed therebetween.

7. A tape drive unit according to claim 6, further including a flywheel concentric with said capstan and driven by the drive source, said transmission roller being engageable at its operative position with both said shaft and said flywheel simultaneously.

8. A tape drive unit according to claim 2, in which said rockable lever is resiliently urged in a direction to move past said one end and to bring the transmission roller into operative connection with the shaft; and said latch means comprises an elongate slot at the end of the rockable lever remote from said one end, said slot being engaged adjacent its one end nearer said one end of the lever by a fixed pin, a stop engaging said slot adjacent the end thereof remote from said one end of the rockable lever, a cam member fixed in position adjacent one side of the rockable lever nearer said shaft, and a second pin secured to said one side of the rockable lever and engaging the cam.

9. A tape drive unit according to claim 1, further including another shaft in parallel relationship with and at a distance from the takeup reel shaft, said another shaft being adapted to carry another reel, said transmission roller being positioned between said takeup reel and said another reel, rewind means for beginning said transmission roller into operative connection with said another shaft while said transmission roller is in operative connection with said drive source, and second reset means for resetting said rewind means.